April 26, 1966 O. E. BECKMAN 3,248,484

FM MULTIPLEX STEREO RECEIVER HAVING SELECTIVE BIAS TO CONDITION RECEIVER FOR STEREOPHONIC RECEPTION ONLY

Original Filed June 7, 1962

INVENTOR.
Orval E. Beckman
BY
Francis W. Crotty
Atty.

United States Patent Office 3,248,484
Patented Apr. 26, 1966

3,248,484
FM MULTIPLEX STEREO RECEIVER HAVING SELECTIVE BIAS TO CONDITION RECEIVER FOR STEREOPHONIC RECEPTION ONLY

Orval E. Beckman, Wheaton, Ill., assignor to Zenith Radio Corporation, Chicago, Ill., a corporation of Delaware Continuation of application Ser. No. 200,856, June 7, 1962. This application Jan. 14, 1965, Ser. No. 427,538
1 Claim. (Cl. 179—15)

Figures 1, 2:
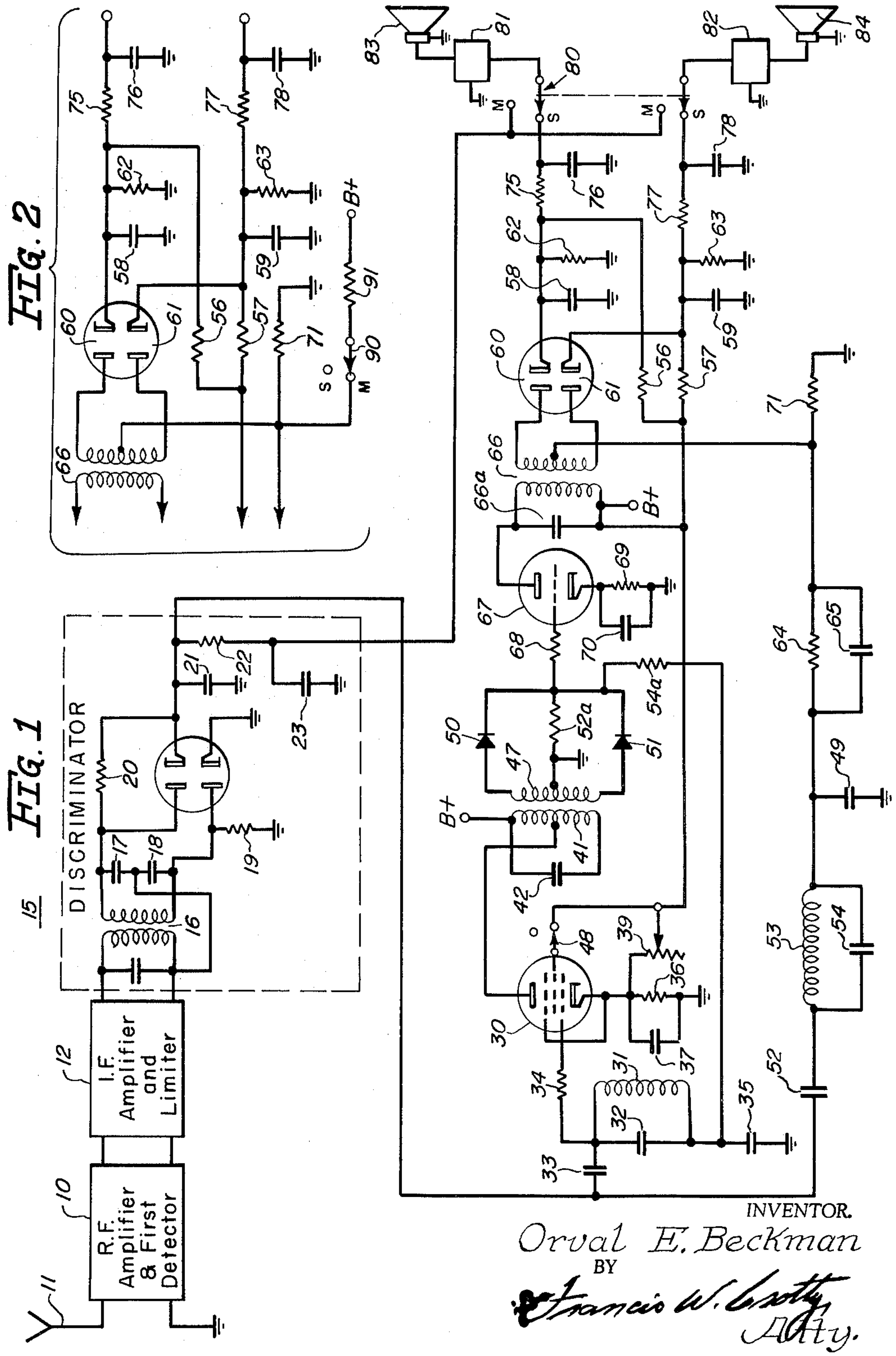

This is a continuation of the copending application of Oval E. Beckman, Serial No. 200,856, filed June 7, 1962, and assigned to the same assignee.

The present invention is directed to a frequency-modulation receiver which may be employed for the reception of monophonic or stereophonic broadcast programs. More specifically, the invention relates to a frequency-modulation receiver which has an operating mode wherein the only programs reproduced are stereophonic broadcasts.

The receiver to be described lends itself particularly well to a stereophonic frequency-modulation broadcasting system of the type disclosed in a copending application of Robert Adler et al., Serial No. 22,926, filed April 18, 1960, and assigned to the same assignee as the present invention. The Adler et al. system is essentially the same as that recently approved by the Federal Communications Commission (F.C.C.) and has now become well-known in the art. Generally, the transmission comprises a carrier frequency-modulated by the sum of two audio program signals collectively constituting a stereophonic program. A conventional FM receiver may, of course, detect this sum signal to the end that the user may completely employ the program as a monophonic reproduction. In addition to frequency-modulation of the carrier by the sum information, the difference information of the same two audio signals is modulated on a suppressed carrier amplitude-modulated subcarrier which, in turn, is frequency-modulated on the principal carrier. Furthermore, a second subcarrier signal may be modulated on the main carrier for such auxiliary services as storecasting or background music.

One receiver for utilizing the above-described stereophonic transmission forms the subject of the application of Adrian J. De Vries, Serial. No. 118,009, filed June 19, 1961, also assigned to the same assignee as the present invention. While the receiver of the De Vries application incorporates several unique circuits, it has been found desirable to provide another receiver which, in one of its operating modes, reproduces only stereophonic broadcast programs.

It is a principal object of this invention to provide a receiver which selectively reproduces only stereophonic broadcast programs.

It is a futher object of the invention to provide a receiver which selectively produces monaural and stereophonic broadcast signals or only stereophonic broadcast signals.

It is another object of this invention to provide a receiver which responds to stereophonic broadcast signals only when the receiver is tuned across the broadcast band.

It is an additional object of the invention to provide a receiver which has the above-mentioned features and which is economical to construct.

A receiver constructed in accordance with the invention is adapted to utilize a frequency modulated monophonic carrier signal or a stereophonic signal comprising a carrier signal frequency modulated in accordance with the sum of two audio signals, a subcarrier signal which has been suppressed-carrier amplitude-modulated with the difference of the two audio signals, and a pilot signal subharmonically related to the subcarrier signal. The receiver comprises a first detector responsive to a received signal for deriving an output signal representing the frequency modulation components of the received carrier signal and a diode amplitude modulation detector coupled thereto and including selective amplifying means to derive the subcarrier from the pilot signal for demodulating the amplitude-modulated subcarrier. Audio amplifying and sound reproduction apparatus is coupled to the detectors to provide an audio rendition of the detected modulation while a first manually operable switch having first and second stable operating positions is coupled to the diode detector to supply a bias thereto of a first magnitude when the switch is in its first position and of a second, different magnitude when in its second position for translating monophonic signals from the first detector to the amplifying and reproduction means when the switch is in the first position and for preventing translation of monophonic signals and only presenting detected stereophonic signals to the amplifying and reproduction means when the switch is in the second position. Additionally, the receiver includes second bistable switch means for disabling the selective amplifying apparatus when only monaural or the monaural portions of stereophonic programs are desired to be received. This device prevents noise otherwise generated in the selective amplifier from being coupled to the audio output stages and thereby deteriorating the quality of the audio rendition.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

FIGURE 1 is a schematic diagram of a radio receiver embodying the apparatus of the invention; and FIGURE 2 is an alternative embodiment of a portion of the apparatus of FIGURE 1.

Before explaining the structure and operation of the receiver of the invention, it is desirable to consider more particularly the stereophonic frequency-modulated broadcast transmitted by arrangement of the above-identified Adler et al. application. It is explained in that application that high fidelity stereophonic reproduction may be attained, with compatibility for monophonic receivers and with accommodation for such auxiliary services as storecasting or background music, by transmitting a signal comprising a carrier frequency-modulated in accordance with the following modulation function:

$$M(t)=K_1(A+B)+K_2(A-B)S+K_3S'$$

where A and B are the two audio signals and the first term of the function represents their sum. The second term represents the fundamental modulation components of a suppressed-carrier amplitude-modulated subcarrier signal conveying the difference information of these audio signals, understanding the expression "fundamental components" to mean the first order modulation sidebands which attend the fundamental of the subcarrier and to exclude higher order sidebands attendant the harmonics of the subcarrier signal. The fundamental of the subcarrier is designated S and S' is a pilot signal related in frequency to the fundamental frequency of the subcarrier. The pilot may be the same frequency as the fundamental of the subcarrier or as in the F.C.C. approved system it may have a harmonic relation therewith, being half the fundamental for example. $K_1$–$K_3$ are constants; preferably $K_1$ and $K_2$ are equal and an order of magnitude larger than $K_3$ so that only a small portion, perhaps 10% of the total deviation, need be devoted to the transmission of the pilot signal.

Referring now to FIGURE 1, the arrangement there represented is a receiver which can provide an audio rendition from a stereo broadcast signal in the form of a carrier modulated in accordance with the sum of the left and right audio program signals and separately modulated in accordance with their difference, and alternatively it can provide an audio rendition from a monaural broadcast signal comprising a carrier signal modulated in accordance with a single audio program signal. The circuits of the receiver at least up to the discriminator are conventional. They include a radio-frequency amplifier of any desired number of stages and a heterodyning stage or first detector, both of these being represented by block 10. The circuits of block 10 further include circuit means for selecting a desired carrier signal from the signals applied to the input of the R.F. amplifying portion from a wave signal antenna 11. The receiver stages 10 connect with a unit 12 which will be understood to include any desired number of stages of intermediate-frequency amplification and one or more amplitude limiters. As stated, these elements are of generally known construction.

It is to be pointed out, however, as explained in the Adler et al. application, that the receiver is to have characteristics which are superior to those normally found in conventional monophonic FM receivers. More specifically, it is preferred that the receiver have a high sensitivity so that the signal-to-noise ratio, particularly on stereophonic operation, will be acceptable in fringe areas. Both automatic gain control for the RF and IF stages and automatic frequency control for the heterodyne oscillator of unit 10 are desirable and may be considered to have been included in the block showing. The intermediate-frequency bandwidth of the usual monaural FM receiver is 150 to 180 kilocycles wide at the —6 decibel point but the bandwidth for the receiver under consideration should be wider to prevent intermodulation or cross-talk of the several services that may be simultaneously accommodated in a single radiation. A bandwidth of 230 kilocycles is adequate if automatic gain control (not shown) maintains the level of signal through the RF and IF amplifiers at a substantially constant value in the face of variations in intensity in the received signal.

Following the IF amplifier and limiter 12 is a frequency-modulation discriminator 15 which may be of the type described in the previously mentioned De Vries application. Discriminator or detector 15 is responsive to the amplitude limited intermediate-frequency signal and demodulates the selected carrier signal to derive a signal representing the frequency modulation components of the received main carrier signal.

The discriminator 15 is coupled to unit 12 through a double-tuned transformer 16 which is selective to the intermediate frequency of the receiver. The discriminator has the usual pair of diodes with their anodes respectively coupled to opposite ends of the secondary winding of transformer 16. Additionally, a pair of capacitors 17 and 18 are connected in series across the secondary winding. A conductor connects the junction of capacitors 17 and 18 to one side of the primary winding of the transformer and provides a quadrature-phase voltage. A resistor 19 couples one of the diode anodes to its associated cathode by way of a ground connection while a resistor 20 couples the remaining anode to its respective cathode. Coupled between the two cathodes of the discriminator diodes is a capacitor 21 and a de-emphasis network comprising a resistor 22 having one terminal connected to the high-potential terminal of capacitor 21 and its remaining terminal coupled to ground by way of another capacitor 23. The modulation components of the incoming broadcast signal are available at the cathode of one of the diodes while the modulation components after de-emphasis are available at the junction of resistor 22 and capacitor 23. The carrier-signal-selecting means of block 10, discriminator 15 and the output network thereof comprise a monaural signal translating channel for providing a monaural output signal when the signal selected for utilization is a monaural broadcast.

While the discriminator may derive a composite signal representing the modulation function in accordance with which the received carrier has been frequency modulated, it is necessary for stereo reproduction to have a further demodulation of the subcarrier which conveys the difference information. This is accomplished by an amplitude modulation detector now to be considered. Since the subcarrier is transmitted with no carrier component, selective amplifying means responsive to the pilot signal of the received transmission is provided as a part of the AM detector to derive a demodulation signal having a frequency equal to the absent subcarrier and a fixed phase relation therewith. This means includes a frequency selective amplifier 30 which is coupled to discriminator 15 by way of a capacitor 33. Capacitor 33 is coupled to a tuned circuit formed by a coil 31 and a capacitor 32 in parallel therewith. One terminal of tuned circuit 31, 32 is returned to ground by way of a capacitor 35 and its other terminal is connected to the grid of amplifier 30 through a resistor 34. This grid also receives a biasing potential by way of a resistor 54 through which it is coupled to the output of a frequency doubler circuit. The cathode of amplifier 30 is returned to ground through a resistor 36 shunted by a bypass capacitor 37 and receives an adjustable bias potential from a suitable source of B+ by way of a potentiometer 39. The screen electrode of amplifier 30 is also coupled to a source of B+ voltage by way of a switch 48 which is of particular utility in conjunction with an alternate embodiment of the invention to be described later herein. The amplifier has a tuned output circuit including the primary winding 41 of a coupling transformer tuned by a capacitor 42 to the pilot frequency. The anode of tube 30 connects with a source of anode potential B+ through winding 41.

Amplifier 30 drives the previously mentioned frequency doubler which is coupled to the amplifier by way of the secondary winding 47 of the coupling transformer. Opposite ends of the secondary connect to the anodes of a pair of diodes 50, 51 having their cathodes connected together and returned to the center point of winding 47 through a resistor *52a*.

The frequency doubler, when excited by the pilot signal, supplies a demodulation signal having a frequency S in a fixed phase relation to the suppressed carried component of the subcarrier conveying the difference information. Sufficient control of its phase may be provided by variable tuning of one or more of the tuned circuits included in the pilot amplifier and frequency doubler chain.

Means are provided for concurrently using both this demodulation signal and the composite signal obtained from the discriminator to derive the requisite left or A and right or B signals. This portion of the AM detector includes a peak diode detector having a pair of diodes 60, 61 retained in a single envelope with respective load impedances 62, 63; however, an average detector such as that shown in the previously mentioned De Vries application may be employed. The carrier selecting apparatus of block 10, the FM detector 15, and the AM detector comprises a stereo signal translating channel for developing a stereo output signal containing the left and right program signals when the selected signal is a stereo broadcast. In parallel relationship with load impedances 62, 63 are the customary capacitors 58, 59. A pair of resistors 56, 57 are coupled between the source of B+ voltage and the cathodes of diodes 60, 61 for supplying a bias potential to the detector. These resistors serve as means for biasing the diodes to a predetermined operative state to render the receiver responsive only to stereo broadcast signals. A connection extends from discriminator 15 by way of the series arrangement of a capacitor 52, an auxiliary subcarrier trap circuit comprising the parallel combination of a coil 53 and a capacitor 54 and a parallel R-C network comprising a resistor 64 and a capacitor 65 to the center point of the diode detector input circuit and provides means for applying one polarity of the composite signal obtained at the detector in push-push relation to the anodes of diodes 60, 61. A resistor 71 couples the center point of the diode detector input circuit to ground. Additionally, a capacitor 49 is coupled between the junction of the trap circuit 53, 54 and the R-C network 64, 5 and ground and together with the trap circuit 53, 54 constitutes a low pass filter for the composite signal.

A transformer 66 provides means for applying the demodulation signal in push-pull relation to diodes 60, 61. Opposite terminals of the secondary of this transformer connect to the anodes of the diodes and the primary, which is tuned by a capacitor 66*a* to the fundamental of the subcarrier, constitutes the anode load of the carrier or demodulation signal amplifier comprising a triode 67. The anode of the triode returns to a source of B+ through the primary winding of transformer 66 while the control electrode thereof is coupled through a series resistor 68 to the junction of the diode cathodes of the frequency doubler. The cathode of triode 67 is grounded through a resistor 69 bypassed by a capacitor 70.

The cathodes of diodes 60, 61 are coupled to filter networks comprising resistor 75 and capacitor 76 for diode 60 and resistor 77 and capacitor 78 for diode 61. The time constants of these filters are approximately 75 microseconds so that they accomplish de-emphasis and effectively attenuate signals above the audio range. The audio signals present at the output of the respective de-emphasis networks are coupled to audio amplifying and sound reproduction means including an A channel amplifier and speaker 81, 83 and a B channel amplifier and speaker 82, 84. This coupling is by way of manually operable switch means 80 having first and second stable operating positions and coupled to at least one of the detectors for presenting only stereophonic program signals to the respective audio amplifiers and loud speakers, when the switch means is in its first operating position, as shown in FIGURE 1. The movable blades of switch 80 may be selectively displaced from a first or stereo position in which they translate the A and B stereo signals from diodes 60, 61 or to a second position wherein both blades are effectively connected together and also to de-emphasis network 22, 23 of discriminator 15 to provide a monaural rendition.

In explaining the operation of the receiver, it is appropriate to consider initially the circuit conditions which prevail when the receiver is tuned to a stereophonic broadcast frequency-modulated in accordance with the previously mentioned modulation function. This signal is selected by the radio-frequency amplifier of unit 10 and is converted to the intermediate-frequency of the receiver. After amplification and amplitude limiting in unit 12, the amplitude-limited intermediate-frequency signal is delivered to discriminator 15. In this discriminator, the frequency-modulated carrier is demodulated in the usual way and develops a composite signal which corresponds to and represents the previously mentioned modulation function.

Tuned circuit 31, 32 selects the pilot signal, the third term of the modulation function, for application to amplifier 30. The pilot signal is amplified and delivered through transformer 41, 47 to the frequency doubler. The frequency doubler may be likened to a full-wave rectifier operating on the pilot signal which is a sinusoidal signal of half the fundamental frequency of the subcarrier conveying the difference information. The high potential terminal of load resistor 52*a* of the frequency doubler develops a direct current (D.C.) component of positive polarity and of substantial value which is fed back to bias the grid of pilot amplifier 30 by way of resistor 54*a* to render the amplifier more sensitive to incoming signals. Capacitor 35 acts as a filter to reduce the ripple of this fed back D.C. voltage. Operation of this portion of the circuitry is explained in detail in the previously mentioned application of Adrian De Vries.

The connection from frequency doubler 50, 51 through amplifier 67 to coupling transformer 66 applies the synchronizing or demodulation signal in push-pull relation to the anodes of diodes 60, 61 of the peak detector. Concurrently, the composite signal of detector 15 is applied in push-push relation to the same diodes through the series coupling arrangement comprising capacitor 52, trap circuit 53, 54 and R-C circuit 64, 65. The concurrent application of the demodulating signal and the composite signal causes peak detection to the end that diode load 62 develops principally the A audio signal while diode load 63 develops principally the B audio signal. The filter networks comprising elements 75, 76 and elements 76, 78 remove superaudible components from the detector output and simultaneously perform the desired function of de-emphasis. It will be appreciated that the conventional practice of frequency modulation transmission features pre-emphasis of the high frequency components which are transmitted to obtain a signal-to-noise advantage and a correlated de-emphasis is required in the receiver to restore the proper weighting of all of the frequency components constituting the audio program signals. The developed A and B program signals are passed through the respective contacts of switch 80 to amplifiers 81 and 82 and are reproduced by speakers 83, 84.

The bias applied to diodes 60, 61 through resistors 56 and 57 is such that a signal may be demodulated thereby and translated to amplifiers 81, 82 only when it is a stereophonic broadcast signal because it is only in the presence of such a signal that a subcarrier component of a magnitude sufficient to overcome the bias of the diodes is injected through amplifier 67. When the selected carrier represents a monaural broadcast and is presented to the secondary winding of transformer 66, it is not of sufficient magnitude to overcome the bias on the diodes and it will not be translated to amplifiers 81, 82. As a result, when a listener tunes across the broadcast band with switch 80 in its stereo position the only programs which will produce a response are those that are stereophonically transmitted.

When the monaural-stereo switch 80 is turned to its monaural position, audio amplifiers 81, 82 receive audio modulation components directly from discriminator-detector 15. As previously mentioned, this discriminator-detector provides the modulation components of the selected carrier irrespective of the type of its transmission, whether it be monaural or stereophonic. Thus with the switch in this position speakers 83, 84 monaurally reproduce both monaural and stereophonical broadcast transmissions.

In summary, when switch 80 is in its monaural position, the receiver monophonically reproduces both monaural and stereo broadcast signals. When switch 80 is in its stereo position, the receiver reproduces stereo broadcast signals only.

The alternative apparatus of FIGURE 2 is analogous to the stereo peak detector of FIGURE 1, however, switch 80 is eliminated and the de-emphasis networks 75, 76 and 77, 78 permanently connected to their respective amplifiers. To bring about operation similar to that previously explained, a resistor 91 and a first manually operable bistable switch 90 are provided between the center tap of the secondary winding of transformer 66 and a B+ source. The position of this monaural-stereo switch 90 controls the bias on diodes 60, 61. The stereo-monaural selector switch here shown, in contrast to that of FIGURE 1, may be said to condition the receiver to provide stereophonic reproduction of the stereo signals and monaural reproduction of monaural signals in its monaural position and to provide stereo reproduction of broadcast signals in its stereo position.

The forward bias applied to diodes 60, 61 from the B+ supply when switch 90 is in its monaural position causes the diodes to have the operative effect of resistors by maintaining them continuously conductive. This forward bias must be sufficient to overcome the bias on the cathodes and also to cause the diodes to freely translate audio signals. If now a monaural broadcast is received, a signal from discriminator 15 reaches diodes 60, 61 by way of the signal path including capacitor 52. This signal is translated without change through both of the diodes, deemphasized by networks 75, 76 and 77, 78 and is reproduced by speakers 83 and 84. In other words, the presence of the forward bias on the diodes converts the peak detectors into passive audio frequency translating elements for translating monaural broadcast signals to amplifiers 81, 82.

However, should the broadcast signal be of the stereo type, it is reproduced stereophonically because the peak detector 60, 61 performs its demodulating function even in the presence of the bias applied by way of resistor 91. For example, if the bias applied to the cathodes of the diodes 60, 61 is 20 volts D.C. and the forward bias applied to the anodes is 40 volts D.C., then the demodulation signal having a peak to peak magnitude of 100 volts and appearing at the output of transformer 66 overrides the small bias and causes capacitors 58, 59 to vary in charge accordingly. The capacitors discharge through resistors 62, 63 respectively, however, the time constants of the associated discharge paths are such that the capacitors cannot discharge sufficiently before the next peak of the demodulation signal arrives and stereo detection results. If switch 48 of FIGURE 1 is ganged with switch 90 so that the selective amplifier is disabled when switch 90 is in the monaural position, i.e., the B+ potential is removed from the screen of tube 30, then the demodulating signal is not developed even during stereo broadcasts and monaural rendition results irrespective of the type of broadcast that is received. This feature also eliminates the possibility of transferring spurious noise developed in the pilot signal chain during monaural broadcasts to audio amplifiers 81, 82 by way of the connection from the discriminator 15 through the pilot signal chain to transformer 66 and thence to the detector diodes. The fidelity of the audio program during monaural broadcasts is thus improved by eliminating this distortion source.

When switch 90 is moved to its alternative or stereo position, the forward bias on the diodes is removed and only stereophonic signals are reproduced by the receiver as previously explained in conjunction with the circuitry of FIGURE 1.

Thus a new stereophonic broadcast receiver has been provided. In one of its operating modes stereophonic and monophonic broadcast signals are reproduced while in another mode of operation only stereophonic signals are reproduced. This invention eliminates the need for complex circuitry which is responsive to stereo broadcast signals to bring about stereo reproduction by the receiver and yet provide a relatively noise-free monaural rendition.

While particular embodiments of the present invention have been shown and described, it is apparent that changes and modifications may be made therein without departing from the invention in its broader aspects. The aim of the appended claim, therefore, is to cover all such changes and modifications as fall within the true spirit and scope of the invention.

I claim:

A receiver for selectively utilizing a frequency modulated monophonic carrier signal or a stereophonic signal comprising a carrier signal frequency modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a first detector responsive to a received signal for deriving an output signal representing the frequency modulation components of the received carrier signal;

a diode amplitude modulation detector coupled to said first detector and including selective amplifying means to derive a demodulation signal of a frequency and a phase substantially identical to that of said subcarrier from said pilot signal for demodulating said amplitude-modulated subcarrier, said selective amplifying means producing spurious electrical signals during the reception of said monophonic signals;

audio amplifying and sound reproduction means coupled to said detectors for providing a faithful audio rendition of said detected modulation, but susceptible to said spurious noise for producing distortion therein during monophonic reception;

means, including a first manually operable switch having a first and second stable operating position coupled to said diode amplitude modulation detector to supply a bias thereto of a first magnitude when said first switch is in said first position and of a second, different magnitude when said switch is in said second position, for translating said monophonic signals from said first detector to said amplifying and reproduction means when said switch is in said first position and for preventing said translation of said monophonic signals and only presenting detected stereophonic signals to said amplifying and reproduction means when said switch is in said second position;

and second bistable switch means for disabling said selective amplifying means during intervals when said first switch means is in said first position to thereby eliminate said distortion from said audio rendition.

References Cited by the Examiner

UNITED STATES PATENTS

| | | | |
|---|---|---|---|
| 3,070,662 | 12/1962 | Eilers | 179—15 |
| 3,087,994 | 4/1963 | Schutte | 179—15 |
| 3,105,117 | 9/1963 | Frank | 179—15 |
| 3,109,896 | 11/1963 | Boothroyd | 179—15 |

FOREIGN PATENTS

| | | |
|---|---|---|
| 1,091,612 | 10/1960 | Germany. |
| 1,248,214 | 10/1960 | France. |
| 1,101,504 | 3/1961 | Germany. |

OTHER REFERENCES

Browne, British Communications and Electronics, March 1960; pages 204 and 205 relied on.

IRE Transactions on Broadcast and Television Receivers, November 1961; pages 40–44 relied on.

DAVID G. REDINBAUGH, *Primary Examiner.*

ROBERT L. GRIFFIN, *Assistant Examiner.*